(12) United States Patent
Jiang et al.

(10) Patent No.: US 10,678,704 B2
(45) Date of Patent: Jun. 9, 2020

(54) METHOD AND APPARATUS FOR ENABLING LARGER MEMORY CAPACITY THAN PHYSICAL MEMORY SIZE

(71) Applicant: Samsung Electronics Co., Ltd., Suwon-si, Gyeonggi-do (KR)

(72) Inventors: Dongyan Jiang, San Jose, CA (US); Changhui Lin, San Jose, CA (US); Krishna Malladi, San Jose, CA (US); Jongmin Gim, Milpitas, CA (US); Hongzhong Zheng, Los Gatos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 204 days.

(21) Appl. No.: 15/476,757

(22) Filed: Mar. 31, 2017

(65) Prior Publication Data

US 2017/0286313 A1    Oct. 5, 2017

Related U.S. Application Data

(63) Continuation-in-part of application No. 15/161,136, filed on May 20, 2016, now Pat. No. 9,983,821, and
(Continued)

(51) Int. Cl.
*G06F 12/1018*    (2016.01)
*G06F 3/06*    (2006.01)
*G06F 12/0864*    (2016.01)

(52) U.S. Cl.
CPC ......... *G06F 12/1018* (2013.01); *G06F 3/061* (2013.01); *G06F 3/065* (2013.01);
(Continued)

(58) Field of Classification Search
CPC ............ G06F 12/1018; G06F 12/0864; G06F 12/0223; G06F 12/0802; G06F 2212/60;
(Continued)

(56) References Cited

U.S. PATENT DOCUMENTS 6,438,560 B1    8/2002    Loen
7,650,460 B2    1/2010    Cheriton
(Continued)

FOREIGN PATENT DOCUMENTS

WO    WO 2015/108931 A1    7/2015

OTHER PUBLICATIONS

Yang et al. "DEBAR a scalable high performance deduplication storage system for backup and archiving" 2010 IEEE International Symposium on Parallel & Distributed Processing (IPDPS) pp. 19-23. Apr. 2010 (Year: 2010).*
(Continued)

*Primary Examiner* — Michael Krofcheck
(74) *Attorney, Agent, or Firm* — Lewis Roca Rothgerber Christie LLP

(57) ABSTRACT

A method of retrieving data stored in a memory associated with a dedupe module is provided. The method includes: identifying a logical address of the data; identifying a physical line ID of the data in accordance with the logical address by looking up at least a portion of the logical address in a translation table; locating a respective physical line, the respective physical line corresponding to the PLID; and retrieving the data from the respective physical line, the retrieving including copying a respective hash cylinder to the read cache, the respective hash cylinder including: a respective hash bucket, the respective hash bucket including the respective physical line; and a respective reference
(Continued)

Related U.S. Application Data a continuation-in-part of application No. 15/162,517, filed on May 23, 2016.

(60) Provisional application No. 62/453,461, filed on Feb. 1, 2017, provisional application No. 62/368,775, filed on Jul. 29, 2016, provisional application No. 62/451,157, filed on Jan. 27, 2017, provisional application No. 62/316,402, filed on Mar. 31, 2016, provisional application No. 62/450,502, filed on Jan. 25, 2017, provisional application No. 62/314,918, filed on Mar. 29, 2016, provisional application No. 62/316,397, filed on Mar. 31, 2016.

(52) U.S. Cl.
CPC .......... *G06F 3/0641* (2013.01); *G06F 3/0644* (2013.01); *G06F 12/0864* (2013.01); *G06F 2212/60* (2013.01); *G06F 2212/68* (2013.01)

(58) Field of Classification Search
CPC .... G06F 2212/68; G06F 3/061; G06F 3/0641; G06F 3/0644; G06F 3/065; G06F 3/0619; G06F 3/0685
See application file for complete search history.

(56) References Cited

U.S. PATENT DOCUMENTS

| | | | |
|---|---|---|---|
| 7,818,495 B2 | 10/2010 | Tanaka et al. | |
| 8,065,476 B2 | 11/2011 | Cheriton | |
| 8,219,534 B2 | 7/2012 | Rao et al. | |
| 8,230,168 B2 | 7/2012 | Cheriton | |
| 8,462,781 B2 | 6/2013 | McGhee et al. | |
| 8,504,791 B2 | 8/2013 | Cheriton et al. | |
| 8,612,673 B2 | 12/2013 | Cheriton | |
| 8,886,508 B2 | 11/2014 | Gullapalli et al. | |
| 8,938,469 B1 | 1/2015 | Keen et al. | |
| 8,938,580 B2 | 1/2015 | Cheriton | |
| 9,069,810 B2 | 6/2015 | Kim et al. | |
| 9,110,789 B1 | 8/2015 | Hayes et al. | |
| 9,116,812 B2 | 8/2015 | Joshi et al. | |
| 9,135,383 B2 | 9/2015 | Gullapalli et al. | |
| 9,141,554 B1 | 9/2015 | Candelaria | |
| 9,141,625 B1 | 9/2015 | Thornewell et al. | |
| 9,148,387 B2 | 9/2015 | Lin et al. | |
| 9,170,940 B2 | 10/2015 | Van De Ven | |
| 9,177,025 B2 | 11/2015 | Bensberg et al. | |
| 9,177,028 B2 | 11/2015 | Chambliss et al. | |
| 9,298,707 B1 | 3/2016 | Zhang et al. | |
| 9,471,500 B2 | 10/2016 | Kruus et al. | |
| 9,489,239 B2 | 11/2016 | Jung et al. | |
| 9,501,421 B1 | 11/2016 | Cheriton | |
| 9,502,139 B1* | 11/2016 | Cheriton | G06F 11/1068 |
| 9,520,193 B2 | 12/2016 | Cheriton | |
| 2005/0166006 A1 | 7/2005 | Talbot et al. | |
| 2009/0265399 A1 | 10/2009 | Cannon et al. | |
| 2011/0258404 A1* | 10/2011 | Arakawa | G06F 3/0608 711/162 |
| 2011/0307447 A1 | 12/2011 | Sabaa et al. | |
| 2012/0102260 A1* | 4/2012 | Kawamura | G06F 3/0608 711/103 |
| 2012/0158674 A1 | 6/2012 | Lillibridge | |
| 2012/0166448 A1 | 6/2012 | Li et al. | |
| 2013/0024645 A1* | 1/2013 | Cheriton | G06F 12/10 711/206 |
| 2013/0151759 A1 | 6/2013 | Shim et al. | |
| 2013/0275699 A1 | 10/2013 | Cheriton | |
| 2014/0115260 A1 | 4/2014 | Maybee et al. | |
| 2014/0188819 A1 | 7/2014 | Bagal et al. | |
| 2014/0281361 A1 | 9/2014 | Park et al. | |
| 2014/0301394 A1 | 10/2014 | Arad et al. | |
| 2014/0334494 A1 | 11/2014 | Lin et al. | |
| 2015/0019507 A1 | 1/2015 | Aronovich | |
| 2015/0019815 A1 | 1/2015 | Aronovich | |
| 2015/0026135 A1 | 1/2015 | Aronovich | |
| 2015/0074339 A1 | 3/2015 | Cheriton | |
| 2015/0127621 A1 | 5/2015 | Kuo | |
| 2015/0161000 A1 | 6/2015 | Kim et al. | |
| 2015/0286639 A1 | 10/2015 | Bordawekar | |
| 2016/0011816 A1 | 1/2016 | Aizman | |
| 2016/0098353 A1 | 4/2016 | Shiu | |
| 2016/0239511 A1 | 8/2016 | Therrien et al. | |
| 2016/0283165 A1 | 9/2016 | Robinson et al. | |
| 2016/0283391 A1 | 9/2016 | Nilsson et al. | |
| 2016/0291891 A1 | 10/2016 | Cheriton | |
| 2017/0031946 A1 | 2/2017 | Sarab | |
| 2017/0109049 A1 | 4/2017 | Cheriton | |

OTHER PUBLICATIONS

Cheriton, David, et al., "HICAMP: Architectural Support for Efficient Concurrency-safe Shared Structured Data Access", ASPLOS XVII Proceedings of the seventeenth international conference on Architectural Support for Programming Languages and Operating Systems, Mar. 3-7, 2012, pp. 287-300.

Litz, Heiner, et al., "Fine-grain Memory Deduplication for In-Memory Database Systems", Stanford University, 2013, 22 pages.

Kim, Yoongu, "HICAMP: Architectural Support for Efficient Concurrency-Safe Shared Structured Data Access—Cheriton et al.,", ASPLOS 2012; Nov. 18, 2013 (43 pages).

Stevenson, John Peter; "Fine-Grain In-Memory Deduplication for Large-Scale Workloads"; A Dissertation Submitted to the Department of Electrical Engineering and the Committee on Graduate Studies of Stanford University in Partial Fulfillment of the Requirements for the Degree of Doctor of Philosophy; http://purl.stanford.edu/rp831pj6163; Dec. 2013 (140 pages).

Herlihy, M., et al., *Hopscotch Hashing*, Proceedings of the $22^{nd}$ International Symposium Distributed Computing, (2008), (16 pages).

Kim, E., et al., *Performance Analysis of Cache-conscious Hashing Techniques for Multicore CPUs*, International Journal of Control and Automation, vol. 6, No. 2, Apr. 2013, pp. 121-134.

Dragojević, A., et al., *FaRM:Fast Remote Memory*, Proceedings of the $11^{th}$ USENIX Symposium on Networked Systems Design and Implementation (NSDI '14), Apr. 2-4, 2014, Seattle, WA, pp. 401-414.

Anthony, Sebastian, "SoC vs. CPU—The battle for the future of computing," ExtremeTech, Apr. 19, 2012. https://www.extremetech.com/computing/126235-soc-vs-cpu-the-battle-for-the-future-of-computing.

U.S. Office Action dated Sep. 11, 2017, for U.S. Appl. No. 15/161,136 (9 pages).

U.S. Office Action dated Sep. 25, 2017, for U.S. Appl. No. 15/162,512 (14 pages).

U.S. Office Action dated Dec. 28, 2018, issued in U.S. Appl. No. 15/498,371 (18 pages).

Final Rejection issued in U.S. Appl. No. 15/498,371 by the USPTO dated Jun. 5, 2019, 8 pages.

* cited by examiner

METHOD AND APPARATUS FOR ENABLING LARGER MEMORY CAPACITY THAN PHYSICAL MEMORY SIZE

CROSS-REFERENCE TO RELATED APPLICATION(S)

his application is a continuation-in-part of U.S. Nonprovisional patent application Ser. No. 15/161,136 filed May 20, 2016, which claims priority to and the benefit of U.S. Provisional Patent Application No. 62/314,918 filed Mar. 29, 2016, and is also a continuation-in-part of U.S. Nonprovisional patent application Ser. No. 15/162,517 filed May 23, 2016, which claims priority to and the benefit of U.S. Provisional Patent Application No. 62/316,397 filed Mar. 31, 2016, and this application further claims priority to and the benefit of U.S. Provisional Patent Application Nos. 62/453,461, filed Feb. 1, 2017, 62/368,775, filed Jul. 29, 2016, 62/451,157, filed Jan. 27, 2017, 62/316,402, filed Mar. 31, 2016, and 62/450,502, filed Jan. 25, 2017, the entire contents of which are incorporated herein by reference.

FIELD

One or more aspects of embodiments according to the present invention relate to system memory and storage, and more particularly, to high capacity low latency memory and storage.

BACKGROUND

Typical modern computer applications such as databases, virtual desktop infrastructure, and data analytics require a large main memory. As computer systems scale to perform more complex data and storage intensive applications, the needs for larger memory capacity increase proportionally.

Typically random-access memory (RAM) is limited in the amount of data that can be stored by the physical design of the RAM. For example, 8 GB DRAM can typically hold a maximum of 8 GB of data. Further, future data center applications will use high capacity low latency memory.

The above information disclosed in this Background section is only to enhance the understanding of the background of the invention, and therefore it may contain information that does not constitute prior art.

SUMMARY

Aspects of embodiments of the present disclosure are directed toward methods and associated structures for enabling memory capacity within random-access memory (RAM) that is larger than the physical memory size of the RAM. According to embodiments of the present invention, deduplication algorithms are used to achieve data memory reduction and context addressing. According to embodiments of the present invention, user data is stored in a hash table which is indexed by the hash value of the user data.

According to an embodiment of the present invention, there is provided a method of retrieving data stored in a memory associated with a dedupe module, the dedupe module including a read cache, the memory including a translation table and a combined data structure, the combined data structure including a hash table and a reference counter table, the hash table and the reference counter table each being stored in a plurality of hash cylinders of the combined data structure, the hash table including a plurality of hash buckets each including a plurality of physical lines, each physical line storing data, the reference counter table including a plurality of reference counter buckets each including a plurality of reference counters. The method includes: identifying a logical address of the data; identifying a physical line ID (PLID) of the data in accordance with the logical address by looking up at least a portion of the logical address in a translation table; locating a respective physical line of the plurality of physical lines, the respective physical line corresponding to the PLID; and retrieving the data from the respective physical line, the retrieving including copying a respective hash cylinder of the plurality of hash cylinders to the read cache, the respective hash cylinder including: a respective hash bucket of the plurality of hash buckets, the respective hash bucket including the respective physical line; and a respective reference counter bucket of the plurality of reference counter buckets, the respective reference counter bucket including a respective reference counter associated with the respective physical line.

The method may further include determining, based on the PLID, that the data is stored in the hash table.

The PLID may be generated utilizing a first hash function applied to the data. The PLID may include an address pointing to a location in the hash table.

The PLID may include: a first identifier indicating whether the data is stored in the hash table or in the overflow memory region; a second identifier indicating a row in which the data is stored; and a third identifier indicating a column (or way) in which the data is stored.

The combined data structure may further include a signature table including a plurality of signature buckets, each signature bucket including a plurality of signatures. The respective hash cylinder may further include a respective signature bucket of the plurality of signature buckets, the respective signature bucket including a respective signature associated with the respective physical line.

The PLID may be generated utilizing a first hash function applied to the data. The PLID may include an address pointing to a location in the hash table. The plurality of signatures may be generated utilizing a second hash function smaller than the first hash function Each reference counter may track a number of dedupes for corresponding data stored in the hash table According to an embodiment of the present invention, there is provided a method of storing data in memory associated with a dedupe engine. The method includes: identifying the data to be stored; determining a first hash value corresponding to where the data should be stored in a hash table in the memory utilizing a first hash function; storing the data at a location in the hash table corresponding to the first hash value; determining a second hash value also corresponding to where the data should be stored utilizing a second hash function smaller than the first hash function; storing the first hash value in a translation table in the memory; and storing the second hash value in a signature table in the memory.

The method may further include incrementing a reference counter, which corresponds to the data, in a reference counter table.

The memory may include: the hash table storing a plurality of data; the translation table storing a plurality of physical line IDs (PLIDs) generated utilizing the first hash function; the signature table storing a plurality of signatures generated utilizing the second hash function; a reference counter table storing a plurality of reference counters, each reference counter tracking a number of dedupes for corresponding data stored in the hash table; and an overflow memory region.

Each of the PLIDs may include: a first identifier indicating whether the data is stored in the hash table or in the overflow memory region; a second identifier indicating a row in which the data is stored; and a third identifier indicating a column in which the data is stored.

The hash table, the signature table, and the reference counter table may be integrated into a combined data structure. The combined data structure may include a plurality of hash cylinders, each hash cylinder including: a hash bucket including a plurality of physical lines; a signature bucket including respective signatures corresponding to the plurality of physical lines; and a reference counter bucket including respective reference counters corresponding to the plurality of physical lines.

The storing the data at a location in the hash table corresponding to the first hash value may include storing the data in the hash bucket corresponding to the first hash value. The storing the second hash value in the signature table may include storing the second hash value in the signature bucket corresponding to the hash bucket where the data is stored.

According to an embodiment of the present invention, there is provided a dedupe module including: a read cache; a dedupe engine to receive a data retrieval request from a host system; and memory, the memory including: a translation table; and a combined data structure including: a hash table including a plurality of hash buckets, each hash bucket including a plurality of physical lines, each physical line storing data; a reference counter table including a plurality of reference counter buckets, each reference counter bucket including a plurality of reference counters; and a plurality of hash cylinders, each hash cylinder including one of the hash buckets and one of the reference counter buckets. The data retrieval request causing the dedupe engine to: identify a logical address of the data; identify a physical line ID (PLID) of the data in accordance with the logical address by looking up at least a portion of the logical address in a translation table; locate a respective physical line of the plurality of physical lines, the respective physical line corresponding to the PLID; and retrieve the data from the physical line, the retrieving of the data including copying a respective hash cylinder of the plurality of hash cylinders to the read cache, the respective hash cylinder including: a respective hash bucket of the plurality of hash buckets, the respective hash bucket including the respective physical line; and a respective reference counter bucket of the plurality of reference counter buckets, the respective reference counter bucket including a respective reference counter associated with the respective physical line.

The data retrieval request may further cause the dedupe engine to determine, based on the PLID, that the data is stored in the hash table.

The PLID may be generated utilizing a first hash function applied to the data. The PLID may include an address pointing to a location in the hash table.

The PLID may include: a first identifier indicating whether the data is stored in the hash table or in the overflow memory region; a second identifier indicating a row in which the data is stored; and a third identifier indicating a column in which the data is stored.

The combined data structure may further include a signature table including a plurality of signature buckets, each signature bucket including a plurality of signatures. The respective hash cylinder may further include a respective signature bucket of the plurality of signature buckets, the respective signature bucket including a respective signature associated with the respective physical line.

The PLID may be generated utilizing a first hash function applied to the data. The PLID may include an address pointing to a location in the hash table. The plurality of signatures may be generated utilizing a second hash function smaller than the first hash function Each reference counter may track a number of dedupes for corresponding data stored in the hash table.

According to an embodiment of the present invention, there is provided a dedupe module including: a host interface; a transfer manager to receive data transfer requests from a host system via the host interface; and a plurality of partitions, each partition including: a dedupe engine to receive partition data requests from the transfer manager; a plurality of memory controllers; a memory manager between the dedupe engine and the memory controller; and a plurality of memory modules, each memory module being coupled to one of the memory controllers.

According to an embodiment of the present invention, there is provided a dedupe module including: a read cache; memory, the memory including: a translation table; and a hash table including a plurality of hash buckets, each hash bucket including a plurality of physical lines, each physical line storing data; and a reference counter table including a plurality of reference counter buckets, each reference counter bucket including a plurality of reference counters; and a dedupe engine to identify V virtual buckets for a first hash bucket of the plurality of hash buckets, the virtual buckets being others of the plurality of hash buckets that are nearby the first hash bucket, the virtual buckets to store some of the first hash bucket's data when the first hash bucket is full, V being an integer that is dynamically set based on how full the first hash bucket's virtual buckets are.

BRIEF DESCRIPTION OF THE DRAWINGS

These and other features and aspects of the present invention will be appreciated and understood with reference to the specification, claims, and appended drawings wherein:

DETAILED DESCRIPTION

Figure 1:
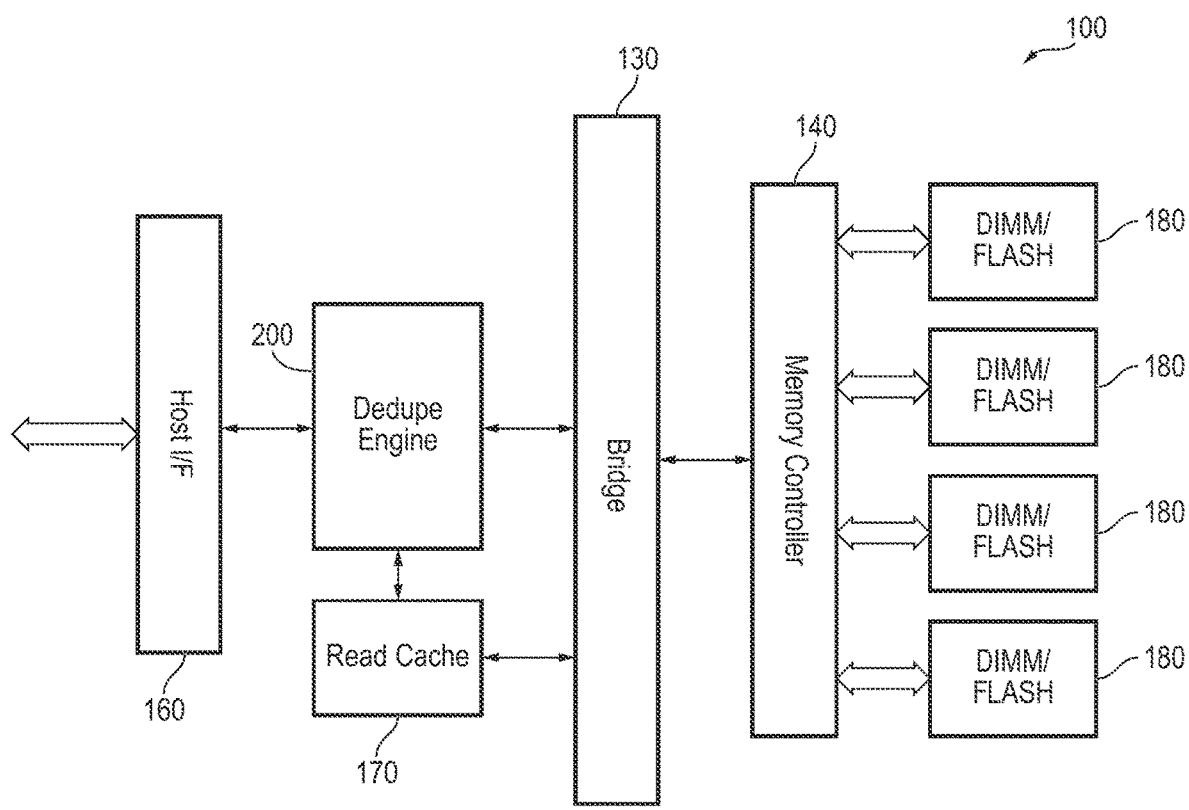
FIG. 1 is a block diagram of a dedupe module according to an embodiment of the present invention.

Embodiments of the present disclosure are directed toward methods and associated structures for enabling memory capacity within memory (e.g., random-access memory (RAM)) that is larger than the physical memory size. According to embodiments of the present invention, deduplication algorithms are used to achieve data memory reduction and context addressing. According to embodiments of the present invention, user data is stored in a hash table which is indexed by the hash value of the user data.

While dynamic random access memory (DRAM) technology scales aggressively beyond 20 nm process technology to meet such increasing needs for memory capacity, techniques, such as deduplication may be applied to increase a virtual memory capacity of the system memory by as much as 2-3 times or more a physical memory capacity of the system memory. In addition, embodiments of the present invention may utilize other types of memory (e.g., flash memory).

Using auxiliary compaction methods, embodiments of the present invention may provide advanced deduplicated memory and data structures in order to consistently achieve a high dedupe ratio by fully utilizing all the memory resources.

Memory devices having high capacity and low latency are highly demanded for data center applications. Such memory device may employ a deduplication scheme as well as a data compaction scheme to provide a larger memory capacity than their physical memory size. Deduplicated memory devices can consistently achieve a high deduplication ratio by reducing the duplicated user data and fully utilizing the available memory resources. In addition, the deduplication scheme employed by the deduplicated memory devices can achieve efficient addressing to the deduplicated data.

Data deduplication, or data duplication elimination, refers to the reduction of redundant data in a memory device to thereby reduce capacity cost of the memory device. In data deduplication, a data object/item (e.g., a data file) is partitioned into one or more lines/chunks/blocks of data. By associating a plurality of the blocks of data consisting of identical data with a single stored block of data, duplicate copies of the blocks of data may be reduced or eliminated by a computer memory, thereby reducing the overall amount of redundant copies of data in the memory device. The reduction of redundant copies of data may increase read latency and memory bandwidth, and may potentially result in power savings.

Accordingly, if duplicated copies of data can be reduced to a single copy of the data, the overall available capacity of the memory device is increased while using the same amount of physical resources. Because the resultant economization of the memory device allows for a reduction in a data rewrite count, and because write requests for duplicated blocks of data that are already stored in the memory may be discarded, a life span of a memory device that implements data deduplication can be prolonged by effectively increasing write endurance.

Related art methods of data deduplication may use in-memory deduplication technology, whereby a deduplication engine is integrated with a central processing unit (CPU) or memory controller (MC) in a CPU-centric approach. Such methods typically implement a deduplicated cache (DDC) that operates with the memory controller to enable the CPU processor's awareness of duplicates, and to attempt to serve deduplicated memory operations (e.g., content lookups, reference count updates, etc.) according to control of the memory controller. Methods of deduplication may also implement a direct translation buffer (DTB), which is a cache for caching translation lines to improve data reads by removing translation fetch from a critical path, and which may be similar to a lookaside buffer.

Deduplication has most commonly been used for hard drives. However, there is interest in providing for fine grain deduplication in the area of volatile memory, such as dynamic random-access memory (DRAM).

The detailed description set forth below in connection with the appended drawings is intended as a description of exemplary embodiments of methods and associated structures for enabling memory capacity within RAM (or other memory storage) that is larger than the physical memory size of the RAM (or the other memory storage) provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

FIG. 1 is a block diagram of a dedupe module according to an embodiment of the present invention. Referring to FIG. 1, a dedupe module 100 according to an embodiment of the present invention includes a bridge 130, a memory controller 140, a host interface (host I/F) 160, a read cache 170, one or more memory modules 180, and a dedupe engine 200.

The bridge 130 may provide an interface for allowing the dedupe engine 200 and the read cache 170 to communicate with the memory controller 140. The memory controller 140 may provide an interface for the bridge 130 and the memory modules 180 to communicate. The read cache 170 may be part of the memory modules 180.

In some embodiments, the bridge 130 may not be present. In this case, the memory controller 140 may communicate directly with the dedupe engine 200 and the read cache 170.

The dedupe engine 200 communicates with a host system via the host I/F 160 in order to store or access data in the memory modules 180. The dedupe engine 200 may further communicate with other components of the host system via the host I/F 160.

The memory modules 180 may be DIMM slots for connecting DRAM or they may be flash memory, slots for connecting other types of memory, etc.

Figure 2:
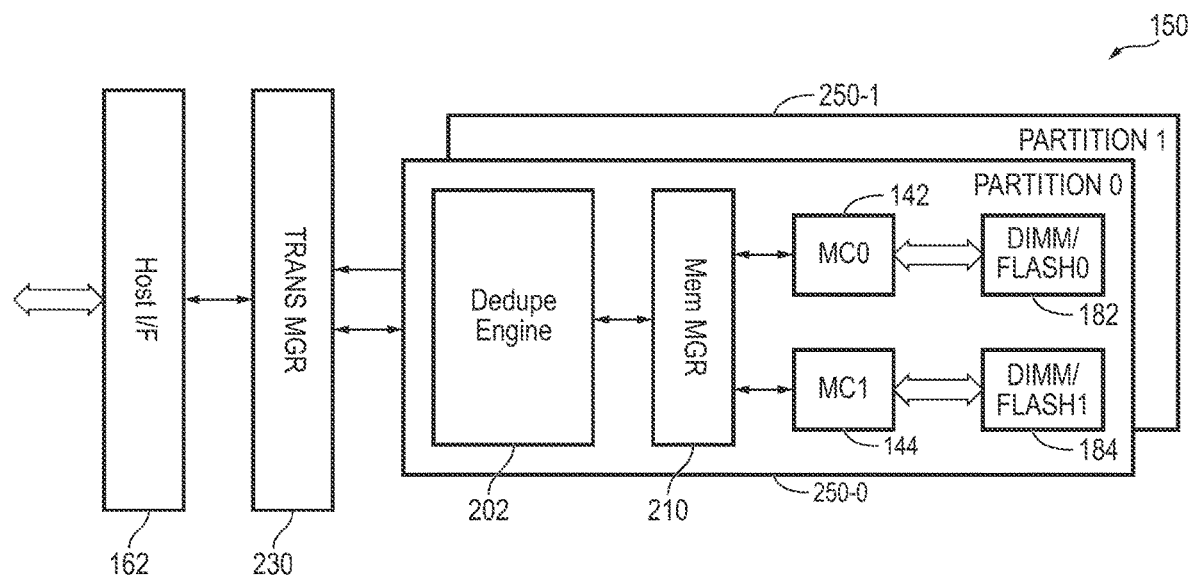
FIG. 2 is a block diagram of a dedupe module according to another embodiment of the present invention.

FIG. 2 is a block diagram of a dedupe module according to another embodiment of the present invention. Referring to FIG. 2, the dedupe module 150 may include one or more partitions 250 (for example, partition 0 205-0, partition 1 205-1, etc.), a transfer manager 230, and a host interface (I/F) 162. Each partition 250 may include a dedupe engine 202, a memory manager 210, one or more memory controllers (for example, memory controller MC0 142, memory controller MC1 144, etc.), and one or more memory modules (for example, DIMM/FLASH0 182, DIMM/FLASH1 184, etc.).

Each of the dedupe engines 202 may communicate directly with either the transfer manager 230 or a host system via the host I/F 162. The transfer manager 230 may communicate with the host system via the host I/F 162.

The transfer manager 230 may receive data transfer requests from a host system via the host I/F 162. The transfer manager 230 may further manage the transfer of data to and from the one or more partitions 250 of the dedupe module. In some embodiments, the transfer manager 230 may determine on which partition 250 to store data that is to be stored (e.g., stored in the RAM). In other embodiments, the transfer manager receives instructions from the host system as to which partition 250 the data should be stored on. In some embodiments, the transfer manager 230 may split the data received from the host system and send it to two or more of the partitions.

The dedupe module 150 may communicate with components of a host system via the host I/F 162.

The dedupe engine 202 may receive partition data requests from the transfer manager 230 for its respective partition 250. The dedupe engine 202 may further control the accessing and storing of data in the memory modules. The memory manager 210 may determine which of the one or more memory modules that the data is stored on or that the data should be stored on. The one or more memory controllers may control the storing or accessing of data on their respective memory modules.

In some embodiments the dedupe engine 202 and the memory manager 210 may be implemented as a single memory manager capable of performing the functions of both the memory manager and the dedupe engine.

The one or more memory controllers, the memory manager 210, and the dedupe engine may each be implemented utilizing any suitable hardware (for example, an application-specific integrated circuit), firmware (for example, a DSP or FPGA), software, or a suitable combination of software, firmware, and hardware. Further, the dedupe engine may be described in more detail hereinafter.

According to some embodiments, when the memory has a large capacity, partitions may be used to reduce a translation table size.

Figure 3:
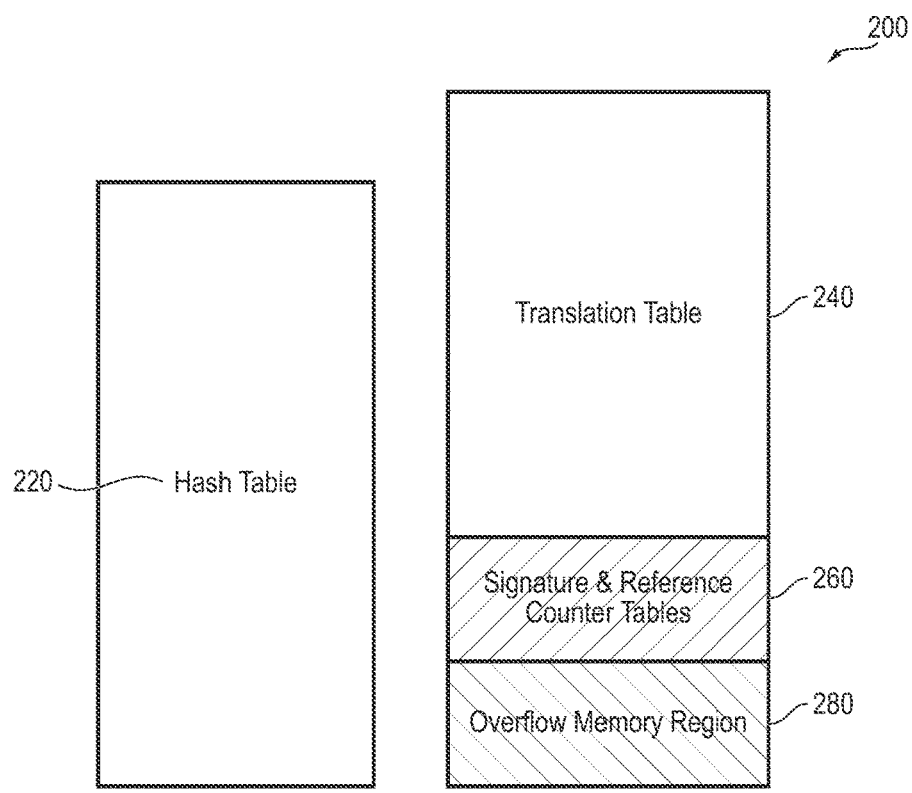
FIG. 3 is a block diagram of a logical view of a dedupe engine according to an embodiment of the present invention.

FIG. 3 is a block diagram of a logical view of a dedupe engine according to an embodiment of the present invention. Referring to FIG. 3, the dedupe engine 200 may include a plurality of tables. The dedupe engine 200 may include a hash table 220, a translation table 240, signature and reference counter tables 260, and an overflow memory region 280.

The hash table 220 may include a plurality of physical lines (PLs). Each physical line may include data (for example, user data). The data within the hash table 220 is deduplicated (i.e., duplicated data has been consolidated into a single location to reduce storage space usage).

The translation table 240 includes a plurality of physical line IDs stored therein. Each physical line of the hash table has an associated physical line ID (PLID) stored in the translation table 240. The PLID, stored in the translation table 240, is a logical address to physical address translation. For example, when the dedupe engine 200 needs to locate data associated with a specific logical address, the dedupe engine 200 can query the data stored at the logical address with the translation table 240 and receive the PLID of the data which correspond to the physical line of the hash table 220 at which the data is stored. The dedupe engine 200 can then access the data stored at the corresponding physical line in the hash table 220.

The PLID may be generated using a first hash function. For example, when data needs to be saved within the hash table, the first hash function is run on the data in order to determine a first hash value which corresponds to the physical line at which the data should be stored. The first hash value is saved as the PLID of the data.

Each PLID indicates the physical location of the targeting data line. Since data lines can be in either the hash table 220 or the overflow memory region 280, PLIDs can be locations in the hash table 220 or the overflow memory region 280.

The hash table 220 may be considered as a table with row-column structure. In this case, the PLID consists of region bit, row bits, and column bits (e.g., see FIG. 4 and description thereof). The first hash function may generate the row bits, which is the starting point to find an available physical line to store the data in. The other bits may be determined when an available physical line is found.

If no available physical line in the hash table 220 is found in the above step, the data may be written to the overflow memory region 280. In this case, PLID will be the physical location of the overflow memory region entry.

A second hash value of the data (e.g., a signature), calculated using a second hash function, is stored in the signature table. The second hash function may be smaller than the first hash function. The first and second hash function may be any suitable hash function and they may be different hash functions.

Signatures may be used for fast comparison between two data lines. When a new data line is about to be written to the hash table 220, a check may be made to see if there is already a same data line in the hash table. Performing this check can avoid storing the same data multiple times.

If the check is made without using signatures, all the data in a particular region of the memory (the whole bucket or the whole virtual bucket) is read to detect duplication. When the check is made using signatures, only the signatures of the data for the particular region are read from memory which may save bandwidth.

When there is no matching signature, there is no data line matching the new data line. Otherwise, when a matching signature is found, the data lines having matching signatures are read from memory to do further comparison, as signature comparison could be a false positive.

Each data line in the hash table has a corresponding signature in signature table and each data line has a corresponding reference counter in the reference counter table.

The reference counter table tracks the number of dedupes (e.g., the amount of times the data has been duplicated) for each of the physical lines in the hash table 220. When an instance of deduped data is added to the hash table, the corresponding reference counter in the reference counter table may be incremented, rather than adding new user data that is the same as user data previously stored, and when an instance of deduped data is deleted from the hash table, the corresponding reference counter in the reference counter table may be decreased by one.

Further, the deduplicated memory (a.k.a. Hash Table) is made up of Physical Lines (PLs), which are the user data C with a fixed-width of bits. The default Physical Line length may be 64-bytes, but the present invention is not limited thereto. The PL length is configurable with the other sizes, for example the PL size may be larger or smaller than 64-bytes. For example, the PL size may be 32-bytes.

A larger PL size may decrease the size of the translation table but may also decrease the amount of duplicated data (i.e., decrease the number of dedupes due to needing to match a much larger pattern of bits). A smaller PL size may increase the size of the translation table but may also increase the amount of duplicated data (i.e., increase the number of dedupes).

The translation table stores the logical address to physical address translations called physical line ID (PLID). The PLID is generated by a hash function h1(C). In addition, for each Physical Line, there is a signature associated with it stored in the signature table. The signature is a much smaller hash result of the user data, which is generated by hash function $h_2(C)$. A reference counter is also associated with the physical line, which is stored in the reference counter table. The reference counter counts the number of times that the user data matches the PL contents (a.k.a. dedupe ratio).

The hash table, the signature table, and the reference counter tables may all have a same data structure but with different granularity.

While the plurality of tables is shown as being part of the dedupe module, the present invention is not limited thereto. According to some embodiments of the present invention, the plurality of tables may be stored in memory (e.g., RAM) that is within the dedupe module and according to other embodiments the plurality of tables is stored in memory (e.g., RAM) outside the dedupe module and are controlled by the dedupe module in the manner described herein.

Additional description of the above features of the present invention may be found in U.S. patent application Ser. No. 15/473,311 the entire content of which is incorporated herein by reference.

Figure 4:
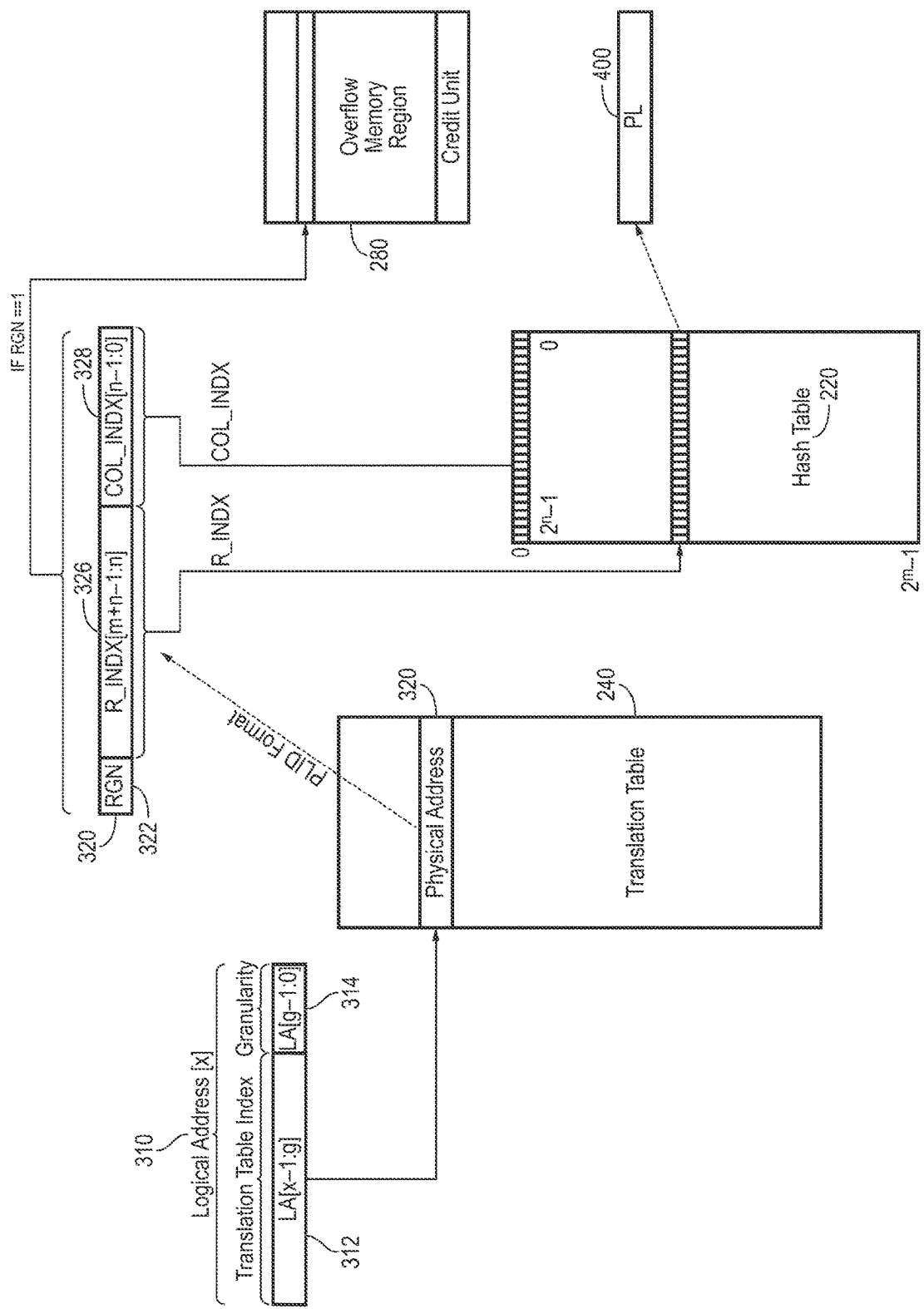
FIG. 4 is a block diagram of a logical view of a dedupe engine including a one-level translation table according to an embodiment of the present invention.

FIG. 4 is a block diagram of a logical view of a dedupe engine including a one-level translation table according to an embodiment of the present invention. The translation table is a major metadata table which may have an impact on the dedupe ratio, system capacity, and/or the system latency due to its size and the time taken to use it. Referring to FIG. 4, a logical address 310 may be used by a computer system as the location of data stored in system memory (e.g., DRAM).

The logical address 310 may be x bits long, where x is an integer. The logical address 310 may include granularity 314 that is g bits long, where g is an integer. The granularity 314 may be located at bits 0 to g−1 of the logical address 310. The logical address 310 may further include a translation table index 312. The translation table index 312 may be x g bits long and may be located at bits g to x−1 of the logical address 310. In some embodiments, when a physical line is 32 bytes long, g is 5 ($2^5$=32) and when a physical line is 64 bytes long, g is 6 ($2^6$=64). In some embodiments, when 1 terabyte (1 TB) of virtual capacity is supported, x is 40 ($2^{40}$ is 1 TB).

The translation table index 312 corresponds to a physical address 320 within the translation table 240. The physical address 320 may include a region bit RGN 322, a row index R_INDX 326, and a column index COL_INDX 328. The region bit RGN 322 may be a single bit and may indicate whether the data is stored in a hash table 220 or in an overflow memory region 280. The row index R_INDX 326 may be m bits corresponding to M rows (0 to M−1 or 0 to $2^m$−1) in the hash table 220. The column index COL_INDX 328 may be n bits and correspond to N columns (0 to N−1 or 0 to $2^n$−1) in the hash table 220. M, N, m, and n are integers. According to some embodiments, when the hash table is 128 GB ($2^{37}$) and g=6, m=26, n=5, M=$2^{26}$, and N=$2^5$.

Further, the overflow memory region 280 stores data that is not placed in the hash table.

Figure 5:
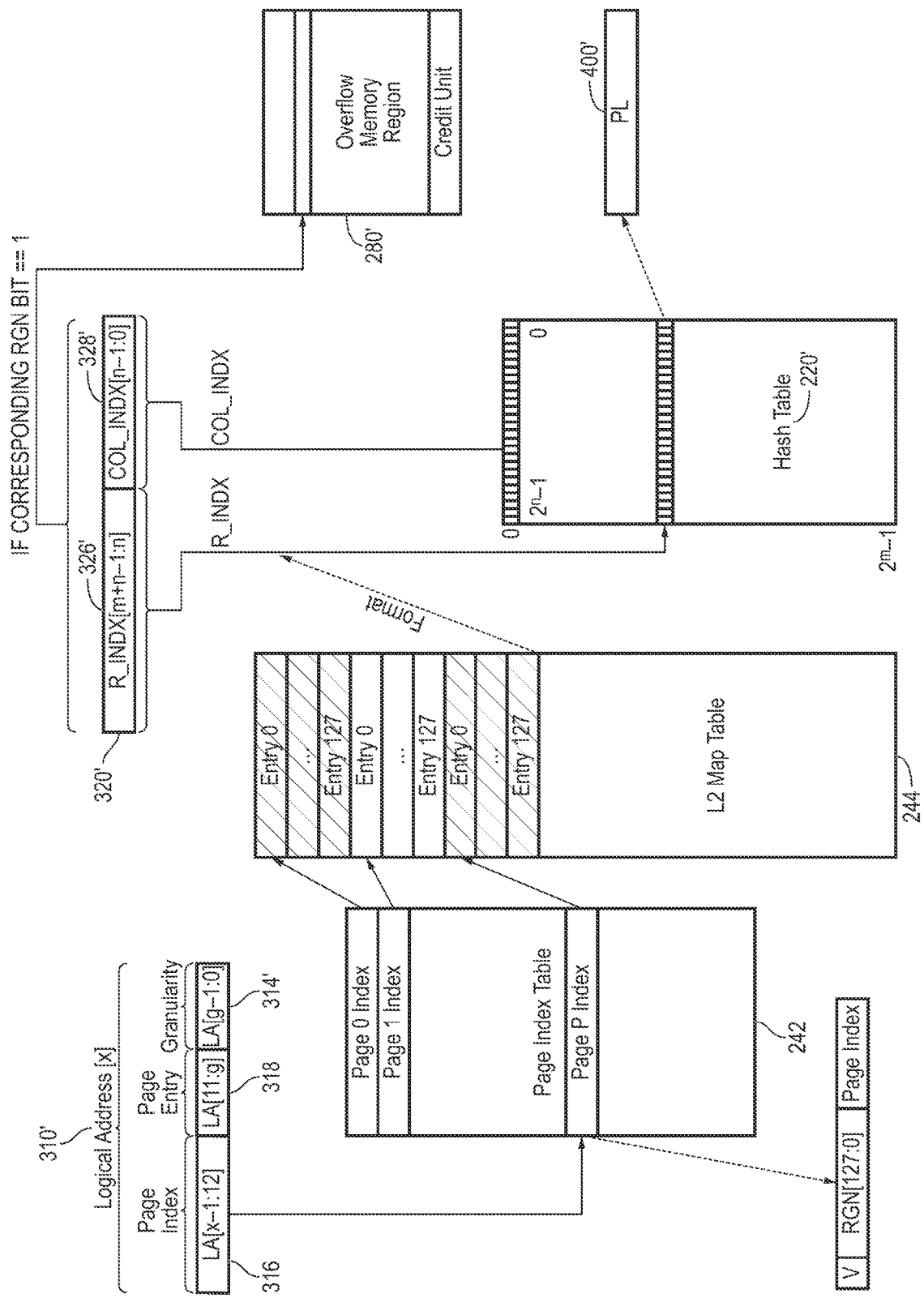
FIG. 5 is a block diagram of a logical view of a dedupe engine including a two-level translation table according to an embodiment of the present invention.

FIG. 5 is a block diagram of a logical view of a dedupe engine including a two-level translation table according to an embodiment of the present invention. The translation table is a major metadata table which may have impact on the dedupe ratio, system capacity, and the system latency. In the dedupe engine of FIG. 5 the translation table includes two levels, a page index table 242 and a level two (L2) map table 244.

A logical address 310' may be used by a computer system as the location of data stored in memory (e.g., RAM). The logical address 310' may be x bits long, where x is an integer. The logical address 310' may include granularity 314' that is g bits long, where g is an integer. The granularity 314' may be located at bits 0 to g−1 of the logical address 310'. The logical address 310' may further include a page entry 318 and a page index 316. The page entry 318 may be 12 g bits long and may be located at bits g to 11 of the logical address 310'. The page index may be x-12 bits long and may be located at bits 12 to x−1 of the logical address 310'. In some embodiments, when a physical line is 32 bytes long, g is 5 ($2^5$=32) and when a physical line is 64 bytes long, g is 6 ($2^6$=64). In some embodiments, when 1 terabyte (1 TB) of virtual capacity is supported, x is 40 ($2^{40}$ is 1 TB).

The page index 316 corresponds to a page within the page index table 242. The page within the page index table 242 corresponds to an entry 0 location within the L2 map table 244. The page entry 318 indicates which entry, following the entry 0, stores the physical address 320' of the stored data corresponding to the logical address 310'.

In other words, the page index 316 is associated with a set of L2 map entries and the page entry 318 designated which entry with the set. The page index 316 leads to the first entry in the set, and the page entry 318 shows which specific entry of that set of entries contains the physical address 320'. Each page in the page index table 242 may include a region bit RGN. The region bit RGN 322' may be a single bit and may indicate whether the data is stored in a hash table 220' or in an overflow memory region 280'.

The physical address 320' may include a row index R_INDX 326' and a column index COL_INDX 328'. The row index R_INDX 326' may be m bits corresponding to M rows (0 to M−1 or 0 to $2^m$−1) in the hash table 220'. The column index COL_INDX 328' may be n bits and correspond to N columns (0 to N−1 or 0 to $2^n$−1) in the hash table 220'. M, N, m, and n are integers. According to some embodiments, when the hash table is 128 GB ($2^{37}$) and g=6, m=26, n=5, M=$2^{26}$, and N=$2^5$.

Further, the overflow memory region 280 stores data that is not placed in the hash table.

Figure 6:
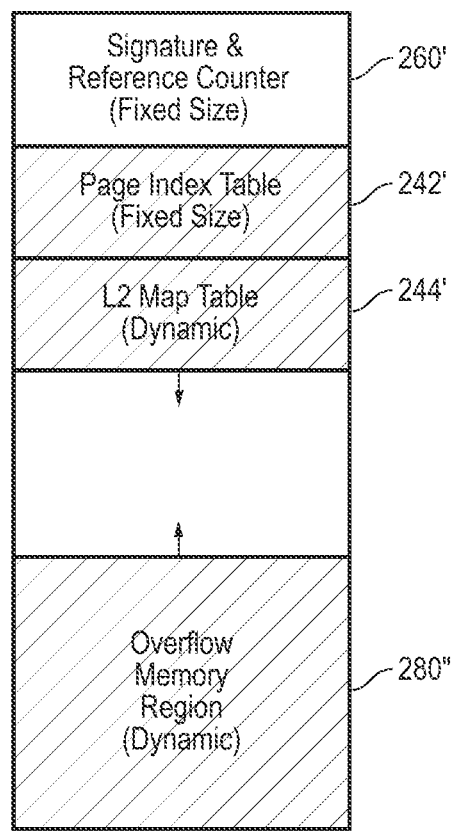
FIG. 6 is a block diagram of a logical view of a dedupe engine including a two-level translation table having a dynamic L2 map table, signature and reference counter tables, and overflow memory region according to an embodiment of the present invention.

FIG. 6 is a block diagram of a logical view of a dedupe engine including a two-level translation table having a dynamic L2 map table and overflow memory region, according to an embodiment of the present invention. Referring to FIG. 6, the two-level translation table may make extra room for the overflow memory region.

According to some embodiments, the sizes of the signature and reference counter tables 260' and the page index table 242' are fixed but the sixes of the L2 map table 244' and the overflow memory region 280'' are dynamic.

As the L2 map table 244' and the overflow memory region 280'' increase in size, they grow towards each other. In this way, storage space may be used efficiently by allowing either the L2 map table 244' or the overflow memory region 280'' to grow into the unused space.

Figure 7:
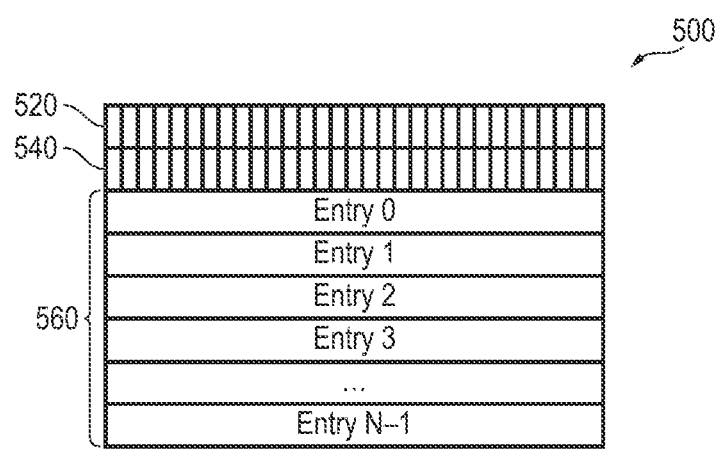
FIG. 7 is a block diagram of a logical view of a hash cylinder according to an embodiment of the present invention.
Figure 8:
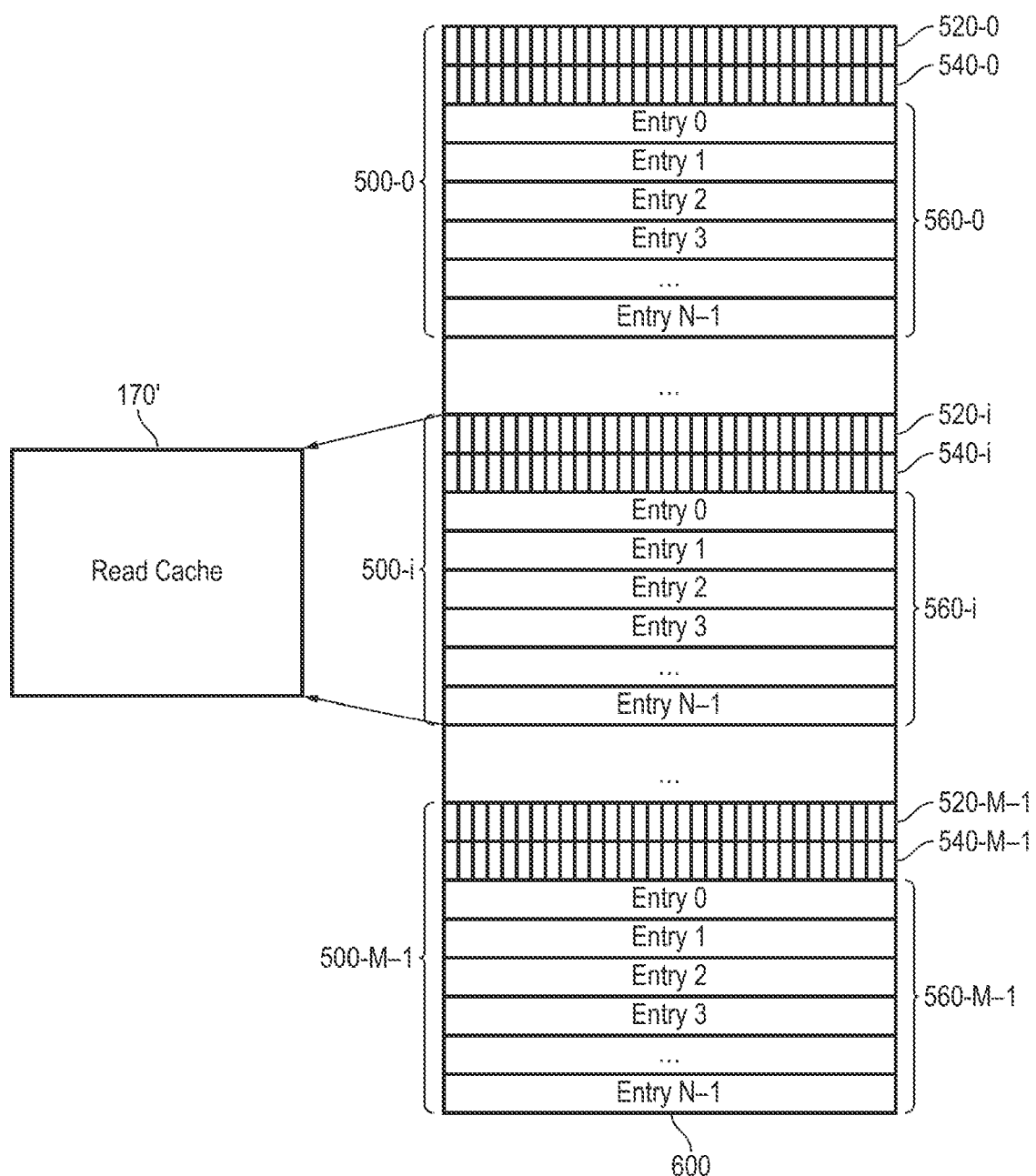
FIG. 8 is block diagram of a logical view of a combined data structure according to an embodiment of the present invention.

FIG. 7 is a block diagram of a logical view of a hash cylinder according to an embodiment of the present invention. FIG. 8 is block diagram of a logical view of a combined data structure according to an embodiment of the present invention. Referring to FIGS. 7 and 8, the signature table, the reference counter table, and the hash table are divided up and arranged in buckets (for example, hash bucket i) within hash cylinders 500 (for example, hash cylinder 500-i) of the combined data structure 600 (e.g., a combined structure 600 or a combined table 600). Each hash cylinder 500 includes a hash bucket 560 of the hash table (for example, hash bucket 560-i), a signature bucket 520 of the signature table (for example, signature bucket 520-i), and a reference counter bucket 540 of the reference counter table (for example, reference counter bucket i).

The hash bucket 560 includes a plurality of entries or physical lines (for example, Entry 0 to Entry N−1).

The signature bucket 520 includes a plurality of signatures which correspond to the data stored in the physical lines within the hash bucket 560 of the same hash cylinder 500.

The reference counter bucket 540 includes a plurality of reference counters which correspond to the number of times the data stored in the physical lines within the hash bucket 560 of the same hash cylinder 500 have been deduped.

In other words the hash table is divided into a plurality of hash buckets 560, each hash bucket 560 including a plurality of entries. The signature table is divided into a plurality of signature buckets 520, each signature bucket 520 including a plurality of signatures. The reference counter table is divided into a plurality of reference counter buckets 540, each reference counter bucket 540 including a plurality of reference counters.

The combined data structure 600 is organized to place one hash bucket 560, one signature bucket 520, and one reference counter bucket 540 together in a hash cylinder 500. According to some embodiments of the present invention, the buckets are arranged in the following order: a first signature bucket 520-0, a first reference counter bucket 540-0, a first hash bucket 560-0, a second signature bucket 520-1, a second reference counter bucket 540-1, a second hash bucket 560-1, etc.

In this arrangement, the first signature bucket 520-0 includes the signatures associated with the data stored in the first hash bucket 560-0 and the first reference counter bucket 540-0 includes the reference counters associated with the data stored in the first hash bucket 560-0. Further, the second signature bucket 520-1 includes the signatures associated with the data stored in the second hash bucket 560-1 and the second reference counter bucket 540-1 includes the reference counters associated with the data stored in the second hash bucket 560-1. Further, a first cylinder 500-0 includes the first signature bucket 520-0, the first reference counter bucket 540-0, and the first hash bucket 560-0 and a second cylinder 500-1 includes the second signature bucket 520-1, the second reference counter bucket 540-1, and the second hash bucket 560-1.

In this way, each hash cylinder 500 includes data and the signatures and reference counters associated with the data stored within the same hash cylinder 500.

When a request is made for data stored within hash cylinder 500-i of the combined data structure 600, the entire hash cylinder 500-i is copied into the read cache 170'. Because the entire hash cylinder 500-i is copied into the read cache 170', the time required to retrieve all of the requested data, the corresponding signature (or respective signature), and the corresponding reference counter (or respective reference counter) can be reduced.

According to some embodiments, the read data cache may be the same size as a hash cylinder.

Further, when the dedupe engine is determining if data already exists within the hash table (in order to avoid duplication) the entire hash cylinder 500 may be copied into the read cache 170'. Because the dedupe engine accesses the signatures, the reference counters, and the data when determining if deduplication is possible and in storing data, having the read cache copy the entire read cylinder may reduce access time and increase overall computation speed.

In other words, to improve latency and performance, the hash cylinder 500 may be created which is the integration unit of hash entries, signature, and reference counter entries. The integrated hash cylinder 500 may improve the system latency by reducing the system memory access cycles. The compacted data structure may reduce memory access times. Each hash cylinder 500 includes all the information needed for the dedupe engine to perform computation. The combined data structure 600 may also make caching easier.

Figure 9:
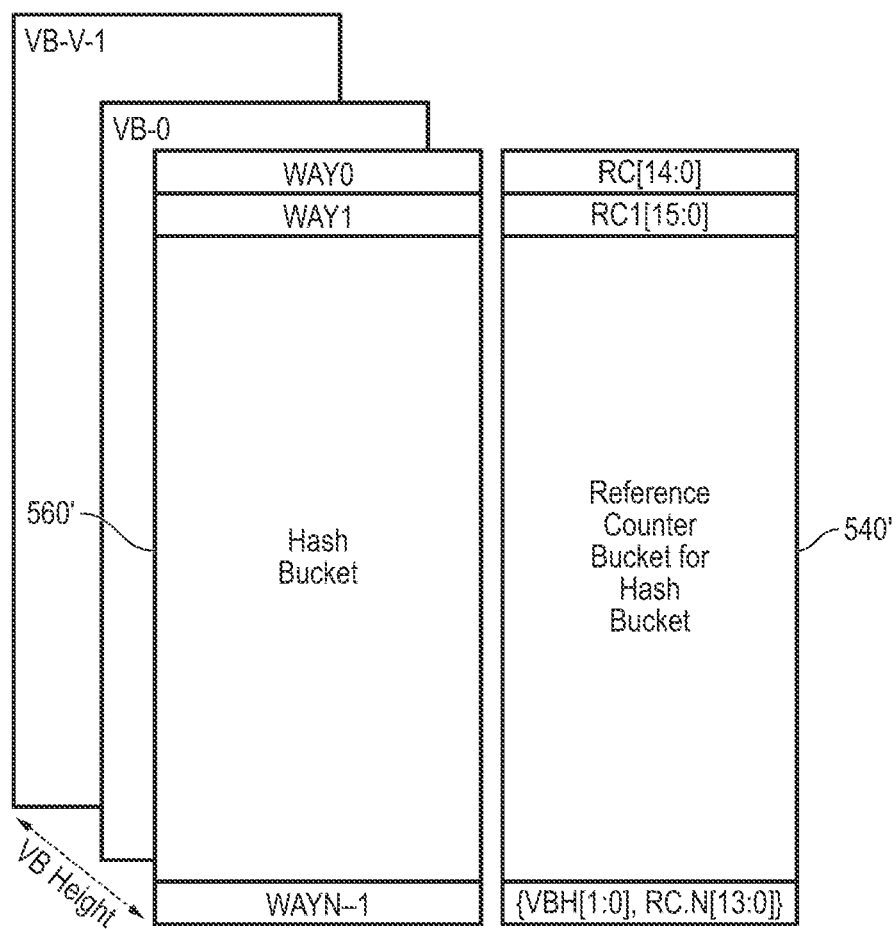
FIG. 9 is a block diagram of a logical view of a hash bucket associated with virtual buckets and a corresponding reference counter bucket according to an embodiment of the present invention.

FIG. 9 is a block diagram of a logical view of a hash bucket associated with virtual buckets and a corresponding reference counter bucket according to an embodiment of the present invention. Referring to FIG. 9, each hash bucket 560' may be associated with one or more virtual buckets VBs (for example, VB-0 to VB-V−1). Each hash bucket 560' may include N ways (for example, WAY0 to WAYN−1).

Unlike related art hash tables, the hash tables of the present embodiment each include a plurality of virtual hash buckets or virtual buckets, the virtual buckets being made of a plurality of physical hash buckets or physical buckets. Hereinafter, the term "physical bucket" will refer to the previously discussed hash buckets, and will be used to distinguish the previously discussed hash buckets from the virtual buckets.

Each virtual bucket may include some of the physical buckets of the hash table. However, it should be noted that different ones of the virtual buckets may share one or more physical buckets. As will be described below, by using virtual buckets according to embodiments of the present invention, an extra dimension is added to the hash table. Accordingly, greater flexibility in arranging and placing data may be provided, thereby increasing efficiency and increasing a compression ratio of the deduplication DRAM system.

The present embodiment uses virtual buckets to increase another level of data placement flexibility, as a block of data stored in one of the hash buckets may be moved within a corresponding virtual bucket, or to a different physical bucket, to free up other physical buckets shared by other virtual buckets. By freeing up space within the hash table, deduplication may be achieved by removing obsolete/duplicated data. That is, by use of the virtual buckets according to embodiments of the present invention, there is no strict limitation caused by hashing a line of data using a hash function to a restricted corresponding location, and data is able to be placed in a nearby/"near-location" physical bucket, which refers to a physical bucket that is within the same virtual bucket that includes the initially intended (but occupied) physical hash bucket.

As an example, content (e.g., a line of data) is to be placed into one of physical buckets. If the line of data is to be placed into a first physical bucket, instead of requiring the line of data to be placed in the physical bucket, the present embodiment allows for a virtual bucket that is larger than a single physical bucket, and that includes the physical bucket, but also includes other physical buckets. That is, the virtual bucket contains an aggregate of contiguous, or adjacent, physical buckets aligned within the hash table.

Accordingly, the virtual buckets allow blocks of data to be moved within the hash table to free up spaces for future write operations.

For an additional description of virtual buckets, please see U.S. patent application Ser. No. 15/162,512, filed May 23, 2016, and Ser. No. 15/162,517 filed May 23, 2016, the entire contents of which are incorporated herein by reference.

Further, virtual buckets may have dynamic heights or sizes. Having a dynamic virtual bucket height (VBH) may improve memory utilization with limited latency impact.

The number of virtual buckets associated with a physical bucket is indicated by the virtual bucket (VB) height index. The virtual bucket height information is stored in the last reference counter of the reference counter bucket 540' associated with the hash bucket 560'. Part of the reference counter's bits are used as the VB height index (e.g., VBH [1:0]).

Using hash bucket i as an example, hash bucket i's virtual buckets may refer to hash bucket i+1 to hash bucket i+V, if the VB height is V. When the hash bucket i is full, the dedupe engine will put the user data in the virtual buckets.

A flag (part of one RC bits, for example, the last RC counter of the hash bucket M) indicates how many virtual buckets are being used by the current hash bucket i. In this way latency may be reduced since we don't need to search more virtual buckets than needed. Related art virtual bucket use a fixed VB height. With a fixed virtual bucket height, the search logic would search all the virtual buckets no matter how many virtual buckets are really used by hash bucket i, which may cause increased latency.

Virtual buckets don't require additional memory space. They use the unused entries in nearby hash buckets. For example, for hash bucket i+1, its virtual buckets may refer to hash bucket i+2 to hash bucket i+V'+1.

Further, when hash bucket i's virtual buckets (e.g., hash bucket i+1 to hash bucket i+V) are full, the dedupe engine, according to an embodiment of the present invention, increases the height V of the virtual bucket to utilize available space in more nearby hash bucket. Because related art virtual bucket heights were preset (rather than dynamic), they could not be increased. As such, when hash bucket i's virtual buckets (e.g., hash buckets hash bucket i+1 to hash bucket i+V) are full, related art dedupe engines could not increase the height V.

In addition, by dynamically adjusting the height of the virtual buckets, when the dedupe engine is determining if data already exists within the hash table (in order to avoid duplication), the dedupe engine will only need to check virtual buckets that are being used rather than a preset number of virtual buckets. This may reduce access time and increase overall computation speed.

Figure 10:
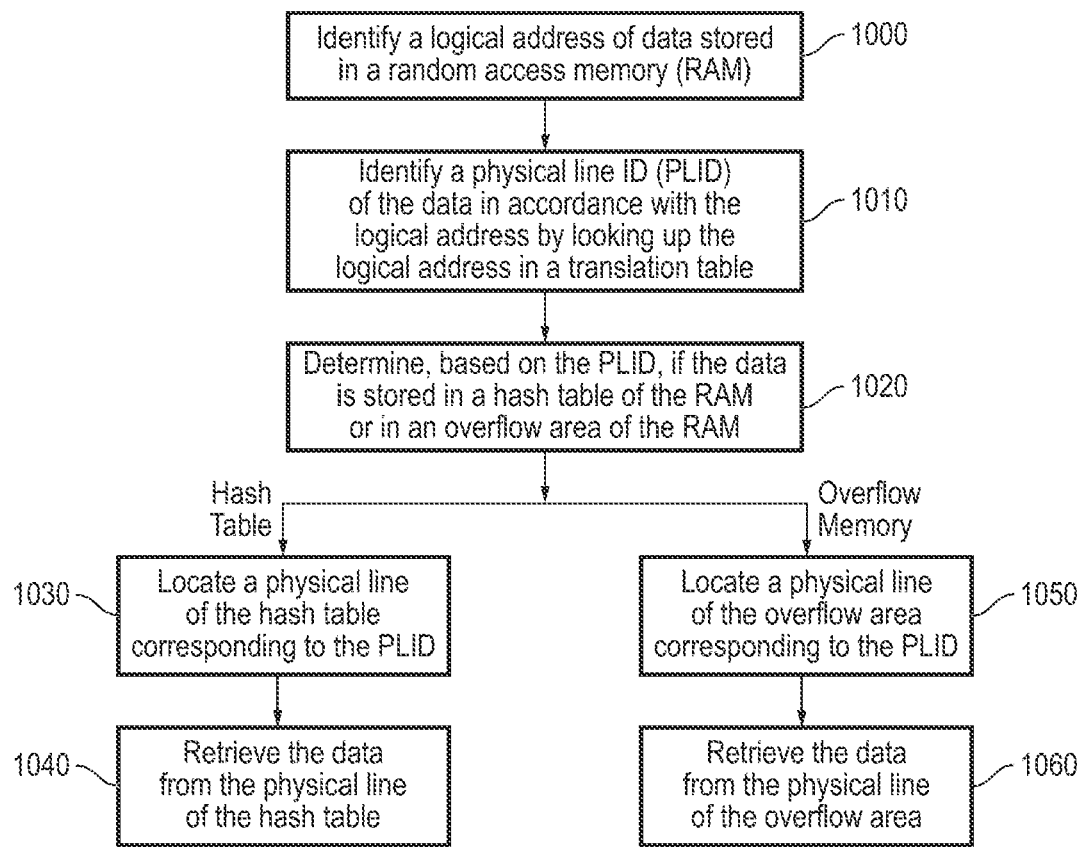
FIG. 10 is a flow chart illustrating a method of retrieving data stored in a random-access memory (RAM) according to an embodiment of the present invention.

FIG. 10 is a flow chart illustrating a method of retrieving data stored in RAM according to an embodiment of the present invention. While FIG. 10 is shown using RAM, the present invention is not limited thereto and any other suitable memory type may be used with the methods herein.

Referring to FIG. 10, a computer system's CPU may request data stored in RAM. The CPU may provide an address for the location of the data within the RAM. The present invention is not limited hereto and, for example, other components may request data from the RAM and provide the logical address.

A method of retrieving data stored within RAM according to embodiments of the present invention includes identifying a logical address of data stored in RAM (1000). The logical address may correspond to a location in a translation table.

The method further includes identifying a physical line ID (PLID) of the data in accordance with the logical address by looking up the logical address in a translation table (1010).

The method further includes determining, based on the PLID, if the data is stored in a hash table of the RAM or in an overflow memory region of the RAM (1020).

When the data is stored in the hash table, the method further includes locating a physical line of the hash table corresponding to the PLID (1030) and retrieving the data from the physical line of the hash table (1040). Retrieving the data may include retrieving corresponding data from a signature table and a reference counter table.

When the data is stored in the overflow memory, the method further includes locating a physical line of the overflow memory region corresponding to the PLID (1050) and retrieving the data from the physical line of the overflow memory region (1060).

The PLID may be generated using a first hash function applied to the data. The PLID may include an address pointing to a location in the hash table of the RAM or in the overflow memory region of the RAM.

The PLID may include: a first identifier (for example, see RGN in FIG. 4) indicating whether the data is stored in the hash table or in the overflow memory region; a second identifier (for example, see R_INDX in FIG. 4) indicating a row in which the data is stored; and a third identifier (for example, see COL_INDX in FIG. 4) indicating a column in which the data is stored.

The method may further include retrieving a signature associated with the data from a signature table.

The RAM may include the hash table storing a plurality of data; the translation table storing a plurality of PLIDs generated using the first hash function; a signature table storing a plurality of signatures generated using a second hash function smaller than the first hash function; a reference counter table storing a plurality of reference counters, each reference counter tracking a number of dedupes for corresponding data stored in the hash table; and the overflow memory region.

The hash table, the signature table, and the reference counter table may be integrated into a combined data structure. The combined data structure may include a plurality of hash cylinders and each hash cylinder may include: a hash bucket including a plurality of physical lines; a signature bucket including respective signatures corresponding to the plurality of physical lines; and a reference counter bucket including respective reference counters corresponding to the plurality of physical lines.

Retrieving the data from the physical line or the overflow memory region may include copying an entire hash cylinder, including the physical line, a corresponding signature, and a corresponding reference counter, to a read cache.

Figure 11:
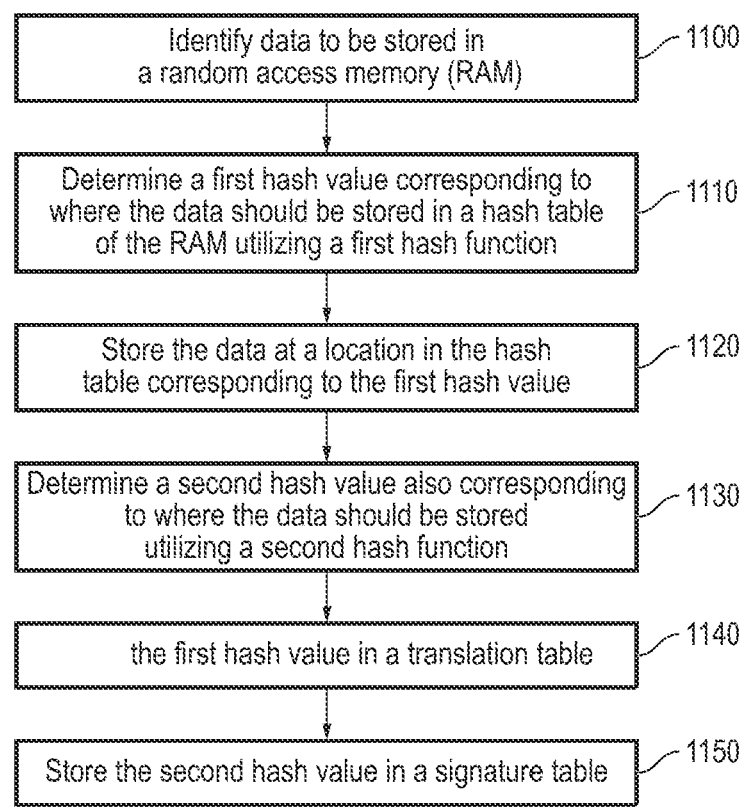
FIG. 11 is a flow chart illustrating a method of storing data in a RAM according to an embodiment of the present invention.

FIG. 11 is a flow chart illustrating a method of storing data in a RAM according to an embodiment of the present invention. While FIG. 11 is shown using RAM, the present invention is not limited thereto and any other suitable memory type may be used with the methods herein.

Referring to FIG. 11, a computer system's CPU may request that data be stored in RAM. The CPU may provide the data to be stored within the RAM. The present invention is not limited hereto and, for example, other components may request that data be stored in the RAM and provide the data.

A method of storing data within RAM according to embodiments of the present invention includes identifying data to be stored in the RAM (1100).

The method further includes determining a first hash value corresponding to where the data should be stored in a hash table of the RAM utilizing a first hash function (1110).

The method further includes storing the data at a location in the hash table corresponding to the first hash value (1120).

The method further includes determining a second hash value also corresponding to where the data should be stored utilizing a second hash function (1130). The second hash function may be smaller than the first hash function.

The method further includes storing the first hash value in a translation table (1140).

The method further includes storing the second hash value in a signature table (1150).

The method may further include incrementing a reference counter, which corresponds to the data, in a reference counter table.

The RAM may include: the hash table storing a plurality of data; the translation table storing a plurality of physical line IDs (PLIDs) generated using the first hash function; the signature table storing a plurality of signatures generated using the second hash function; a reference counter table storing a plurality of reference counters, each reference counter tracking a number of dedupes for corresponding data stored in the hash table; and an overflow memory region.

Each of the PLIDs may include: a first identifier (for example, see RGN in FIG. 4) indicating whether the data is stored in the hash table or in the overflow memory region; a second identifier (for example, see R_INDX in FIG. 4) indicating a row in which the data is stored; and a third identifier (for example, see COL_INDX in FIG. 4) indicating a column in which the data is stored.

The hash table, the signature table, and the reference counter table may be integrated into a combined data structure. The combined data structure may include a plurality of hash cylinders. Each hash cylinder may include: a hash bucket including a plurality of physical lines; a signature bucket including respective signatures corresponding to the plurality of physical lines; and a reference counter bucket including respective reference counters corresponding to the plurality of physical lines.

Storing the data at a location in the hash table corresponding to the first hash value may include storing the data in a hash bucket corresponding to the first hash value. Storing the second hash value in the signature table may include storing the second hash value in the signature bucket corresponding to the hash bucket where the data is stored.

Therefore, embodiments of the present disclosure are directed toward methods and associated structures for enabling memory capacity within memory (e.g., RAM) that is larger than the physical memory size. According to embodiments of the present invention, deduplications are used to achieve data memory reduction and context addressing. According to embodiments of the present invention, user data is stored in a hash table which is indexed by the hash value of the user data.

It will be understood that, although the terms "first," "second," "third," etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the spirit and scope of the present invention.

A relevant device or component (or relevant devices or components), e.g., dedupe engine, according to embodiments of the present invention described herein may be implemented utilizing any suitable hardware (for example, an application-specific integrated circuit), firmware (for example, a DSP or FPGA), software, or a suitable combination of software, firmware, and hardware. For example, the various components of the relevant device(s) may be formed on one integrated circuit (IC) chip or on separate IC chips. Further, the various components of the relevant device (s) may be implemented on a flexible printed circuit film, a tape carrier package (TCP), a printed circuit board (PCB), or formed on a same substrate as one or more circuits and/or other devices. Further, the various components of the relevant device(s) may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Further, it will also be understood that when one element, component, region, layer, and/or section is referred to as being "between" two elements, components, regions, layers, and/or sections, it can be the only element, component, region, layer, and/or section between the two elements, components, regions, layers, and/or sections, or one or more intervening elements, components, regions, layers, and/or sections may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprise," "comprises," "comprising," "includes," "including," and "include," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. Expressions such as "at least one of," "one of," and "selected from," when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration.

As used herein, the terms "use," "using," and "used" may be considered synonymous with the terms "utilize," "utilizing," and "utilized," respectively.

Features described in relation to one or more embodiments of the present invention are available for use in conjunction with features of other embodiments of the present invention. For example, features described in a first embodiment may be combined with features described in a second embodiment to form a third embodiment, even though the third embodiment may not be specifically described herein.

A person of skill in the art should also recognize that the process may be executed via hardware, firmware (for example via an ASIC), or in any combination of software, firmware, and/or hardware. Furthermore, the sequence of steps of the process is not fixed, but can be altered into any desired sequence as recognized by a person of skill in the art. The altered sequence may include all of the steps or a portion of the steps.

Although this invention has been described with regard to certain specific embodiments, those skilled in the art will have no difficulty devising variations of the described embodiments, which in no way depart from the scope and spirit of the present invention. Furthermore, to those skilled in the various arts, the invention itself described herein will suggest solutions to other tasks and adaptations for other applications. It is the Applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents.

What is claimed is:

1. A method of retrieving data stored in a memory associated with a dedupe module, the method comprising:
   identifying a logical address of the data;
   identifying a physical line ID (PLID) of the data in accordance with the logical address by looking up at least a portion of the logical address in a translation table, wherein the PLID comprises a first identifier indicating whether the data is stored in a hash table or in an overflow memory region;
   determining that the data is stored in the hash table or the overflow memory region using the first identifier;
   locating a physical line corresponding to the PLID; and
   retrieving the data from the physical line, the retrieving comprising copying a hash cylinder to a read cache, the hash cylinder comprising:
      a hash bucket comprising the respective physical line; and
      a reference counter bucket comprising a reference counter associated with the physical line.

2. The method of claim 1,
   wherein the PLID is generated utilizing a first hash function applied to the data, and
   wherein the PLID further comprises an address pointing to a location in the hash table.

3. The method of claim 2, wherein the PLID further comprises:
   a second identifier indicating a row in which the data is stored; and
   a third identifier indicating a column in which the data is stored.

4. The method of claim 1,
   wherein the reference counter bucket is part of a reference counter table,
   wherein the hash table and reference counter table are part of a combined data structure,
   wherein the combined data structure further comprises a signature table comprising a plurality of signature buckets, each signature bucket comprising a plurality of signatures, and
   wherein the hash cylinder further comprises a respective signature bucket of the plurality of signature buckets, the respective signature bucket comprising a signature associated with the physical line.

5. The method of claim 4,
   wherein the PLID is generated utilizing a first hash function applied to the data,
   wherein the PLID comprises an address pointing to a location in the hash table, and
   wherein the plurality of signatures are generated utilizing a second hash function smaller than the first hash function.

6. The method of claim 1, wherein the reference counter tracks a number of dedupes for corresponding data stored in the hash table.

7. A method of storing data in memory associated with a dedupe engine, the method comprising:
   identifying the data to be stored;
   determining a first hash value corresponding to a physical line where the data should be stored in a hash table in the memory utilizing a first hash function;
   storing the data at a location in the hash table corresponding to the first hash value when the physical line is available and a location corresponding to an overflow memory region when the physical line is not available;
   setting a physical line ID (PLID) of the data according to the location, wherein the PLID comprises a first identifier indicating whether the data is stored in the hash table or in the overflow memory region;
   determining a second hash value also corresponding to where the data should be stored utilizing a second hash function smaller than the first hash function;
   storing the first hash value in a translation table in the memory; and
   storing the second hash value in a signature table in the memory.

8. The method of claim 7, further comprising incrementing a reference counter, which corresponds to the data, in a reference counter table.

9. The method of claim 7, wherein the memory comprises:
   the hash table storing a plurality of data;
   the translation table storing a plurality of PLIDs generated utilizing the first hash function;
   the signature table storing a plurality of signatures generated utilizing the second hash function;
   a reference counter table storing a plurality of reference counters, each reference counter tracking a number of dedupes for corresponding data stored in the hash table; and
   the overflow memory region.

10. The method of claim 9, wherein each of the PLIDs further comprise:
    a second identifier indicating a row in which the data is stored; and
    a third identifier indicating a column in which the data is stored.

11. The method of claim 9, wherein the hash table, the signature table, and the reference counter table are integrated into a combined data structure, and
    wherein the combined data structure comprises a plurality of hash cylinders, each hash cylinder comprising:
       a hash bucket comprising a plurality of physical lines;
       a signature bucket comprising respective signatures corresponding to the plurality of physical lines; and
       a reference counter bucket comprising respective reference counters corresponding to the plurality of physical lines.

12. The method of claim 11,
wherein the storing the data at a location in the hash table corresponding to the first hash value comprises storing the data in the hash bucket corresponding to the first hash value, and
wherein the storing the second hash value in the signature table comprises storing the second hash value in the signature bucket corresponding to the hash bucket where the data is stored.

13. A dedupe module comprising:
a read cache;
a dedupe engine to receive a data retrieval request from a host system; and
memory, the memory comprising:
    a translation table; and
    a combined data structure comprising:
        a hash table comprising a plurality of hash buckets, each hash bucket comprising a plurality of physical lines, each physical line storing data;
        a reference counter table comprising a plurality of reference counter buckets, each reference counter bucket comprising a plurality of reference counters; and
        a plurality of hash cylinders, each hash cylinder comprising one of the hash buckets and one of the reference counter buckets,
    wherein the data retrieval request causes the dedupe engine to:
        identify a logical address of the data;
        identify a physical line ID (PLID) of the data in accordance with the logical address by looking up at least a portion of the logical address in the translation table, wherein the PLID comprises a first identifier indicating whether the data is stored in the hash table or in an overflow memory region;
        determining that the data is stored in the hash table or overflow memory region using the first identifier;
        locate a respective physical line of the plurality of physical lines, the respective physical line corresponding to the PLID; and
        retrieve the data from the respective physical line in the hash table or overflow memory region, the retrieving of the data comprising copying a respective hash cylinder of the plurality of hash cylinders to the read cache, the respective hash cylinder comprising:
            a respective hash bucket of the plurality of hash buckets, the respective hash bucket comprising the respective physical line; and
            a respective reference counter bucket of the plurality of reference counter buckets, the respective reference counter bucket comprising a respective reference counter associated with the respective physical line.

14. The dedupe module of claim 13, wherein the data retrieval request further causes the dedupe engine to determine, based on the PLID, that the data is stored in the hash table.

15. The dedupe module of claim 13,
wherein the PLID is generated utilizing a first hash function applied to the data, and
wherein the PLID comprises an address pointing to a location in the hash table.

16. The dedupe module of claim 15, wherein the PLID further comprises:

a second identifier indicating a row in which the data is stored; and
a third identifier indicating a column in which the data is stored.

17. The dedupe module of claim 13,
wherein the combined data structure further comprises a signature table comprising a plurality of signature buckets, each signature bucket comprising a plurality of signatures, and
wherein the respective hash cylinder further comprises a respective signature bucket of the plurality of signature buckets, the respective signature bucket comprising a respective signature associated with the respective physical line.

18. The dedupe module of claim 17,
wherein the PLID is generated utilizing a first hash function applied to the data,
wherein the PLID comprises an address pointing to a location in the hash table, and
wherein the plurality of signatures are generated utilizing a second hash function smaller than the first hash function.

19. The dedupe module of claim 13, wherein each reference counter tracks a number of dedupes for corresponding data stored in the hash table.

20. A dedupe module comprising:
a host interface;
a transfer manager to receive data transfer requests from a host system via the host interface; and
a plurality of partitions, each partition comprising:
    a dedupe engine to receive partition data requests from the transfer manager and a data retrieval request from a host system;
    a plurality of memory controllers;
    a memory manager between the dedupe engine and the memory controller; and
    a plurality of memory modules, each memory module being coupled to one of the memory controllers,
    wherein the data retrieval request causes the dedupe engine to:
        identify a logical address of the data in the memory modules;
        identify a physical line ID (PLID) of the data in accordance with the logical address by looking up at least a portion of the logical address in a translation table, wherein the PLID comprises a first identifier indicating whether the data is stored in a hash table or in an overflow memory region;
        locate a physical line; and
        retrieve the data from a physical line in the hash table or overflow memory region corresponding to the PLID.

21. A dedupe module comprising:
a read cache;
memory, the memory comprising:
    a translation table; and
    a hash table comprising a plurality of hash buckets, each hash bucket comprising a plurality of physical lines, each physical line storing data; and
    a reference counter table comprising a plurality of reference counter buckets, each reference counter bucket comprising a plurality of reference counters; and
a dedupe engine to identify V virtual buckets for a first hash bucket of the plurality of hash buckets, the virtual buckets being others of the plurality of hash buckets that are nearby the first hash bucket, the virtual buckets to store some of the first hash bucket's data when the first hash bucket is full, V being an integer that is dynamically set based on how full the first hash bucket's virtual buckets are.

\* \* \* \* \*